United States Patent
Li et al.

(10) Patent No.: US 9,946,462 B1
(45) Date of Patent: Apr. 17, 2018

(54) ADDRESS MAPPING TABLE COMPRESSION

(71) Applicant: Seagate Technology LLC, Cupertino, CA (US)

(72) Inventors: Peng Li, Lauderdale, MN (US); Kevin Arthur Gomez, Eden Prairie, MN (US); Ryan James Goss, Prior Lake, MN (US)

(73) Assignee: Seagate Technology LLC, Cupertino, CA (US)

(*) Notice: Subject to any disclaimer, the term of this patent is extended or adjusted under 35 U.S.C. 154(b) by 12 days.

(21) Appl. No.: 15/044,007

(22) Filed: Feb. 15, 2016

(51) Int. Cl.
*G06F 12/00* (2006.01)
*G06F 13/00* (2006.01)
(Continued)

(52) U.S. Cl.
CPC .......... *G06F 3/0608* (2013.01); *G06F 3/0659* (2013.01); *G06F 3/0688* (2013.01);
(Continued)

(58) Field of Classification Search
CPC ........ G06F 3/06; G06F 3/0601; G06F 3/0602; G06F 3/0608; G06F 3/0614; G06F 3/0616; G06F 3/0617; G06F 3/0619; G06F 3/0628; G06F 3/0629; G06F 3/0631; G06F 3/0632; G06F 3/0634; G06F 3/0635; G06F 3/0637; G06F 3/0638; G06F 3/064; G06F 11/00; G06F 11/1076; G06F 12/00; G06F 12/02; G06F 12/0223; G06F 12/023; G06F 12/0238; G06F 12/0246; G06F 12/0284; G06F 12/0292; G06F 12/08;
(Continued)

(56) References Cited

U.S. PATENT DOCUMENTS 5,410,671 A 4/1995 Elgamal et al.
5,537,658 A * 7/1996 Bakke .................. G06F 3/0601
707/999.2
(Continued)

OTHER PUBLICATIONS

Paging: Faster Translations (TLBs); Feb. 22, 2014; retrieved from https://web-beta.archive.org/web/20140222024526/http://pages.cs.wisc.edu/~remzi/OSTEP/vm-tlbs.pdf on Apr. 20, 2017 (17 pages).*
(Continued)

*Primary Examiner* — Daniel C Chappell
(74) *Attorney, Agent, or Firm* — Cesari & Reed, LLP; Kirk A. Cesari; Christian W. Best

(57) ABSTRACT

Mapping table entries that map logical block addresses to physical block addresses can be intercepted and compressed to save space. In some cases, the mapping table entries can be compressed into compression units, which can hold multiple mapping table entries. Portions of the mapping table entries can be arranged into groups, and a group can be compressed with a unique compression method. The compression method used to compress a group may be based on data characteristics of the group. When data corresponding to the mapping table entries are read or modified, the compressed data can be decompressed and provided to a requesting controller or processor. When the mapping table entry is modified, the updated mapping entry may be arranged into groups, and the groups can be compressed and stored to the compression units.

20 Claims, 8 Drawing Sheets

(51) Int. Cl.
*G06F 13/28* (2006.01)
*G06F 3/06* (2006.01)
*G06F 12/1009* (2016.01)
*G06F 12/109* (2016.01)

(52) U.S. Cl.
CPC ........ *G06F 12/109* (2013.01); *G06F 12/1009* (2013.01); *G06F 2212/65* (2013.01)

(58) Field of Classification Search
CPC .. G06F 12/0802; G06F 12/10; G06F 12/1009; G06F 12/1018; G06F 12/1027; G06F 12/1036; G06F 12/1045; G06F 12/1054; G06F 12/1063; G06F 12/1072; G06F 12/1081; G06F 12/109; G06F 13/00; G06F 2003/0691; G06F 2003/0692; G06F 2003/0694; G06F 2003/0695; G06F 2003/0697; G06F 2003/0698; G06F 2212/21; G06F 2212/211; G06F 2212/2112; G06F 2212/213; G06F 2212/214; G06F 2212/2142; G06F 2212/2146; G06F 2212/217; G06F 2212/22; G06F 2212/221; G06F 2212/222; G06F 2212/2228; G06F 2212/224; G06F 2212/225; G06F 2212/25; G06F 2212/251; G06F 2212/2515; G06F 2212/253; G06F 2212/2532; G06F 2212/254; G06F 2212/2542; G06F 2212/26; G06F 2212/261; G06F 2212/262; G06F 2212/263; G06F 2212/264; G06F 2212/28; G06F 2212/281; G06F 2212/283; G06F 2212/285; G06F 2212/286; G06F 2212/30; G06F 2212/301; G06F 2212/302; G06F 2212/303; G06F 2212/3035; G06F 2212/304; G06F 2212/3042; G06F 2212/305; G06F 2212/306; G06F 2212/31; G06F 2212/311; G06F 2212/312; G06F 2212/313; G06F 2212/314; G06F 2212/40; G06F 2212/401; G06F 2212/402; G06F 2212/403; G06F 2212/46; G06F 2212/461; G06F 2212/462; G06F 2212/463; G06F 2212/464; G06F 2212/465; G06F 2212/466; G06F 2212/468; G06F 2212/50; G06F 2212/502; G06F 2212/507; G06F 2212/65; G06F 2212/651; G06F 2212/652; G06F 2212/653; G06F 2212/654; G06F 2212/655; G06F 2212/656; G06F 2212/657; G06F 2212/68; G06F 2212/681; G06F 2212/682; G06F 2212/683; G06F 2212/684; G06F 2212/72; G06F 2212/7201; G06F 2212/7202; G06F 2212/7203; G06F 2212/7204; G06F 2212/7205; G06F 2212/7206; G06F 2212/7208; G06F 2212/7209; G06F 2212/7211; G06F 3/0641; G06F 3/0643; G06F 3/0644; G06F 3/0646; G06F 3/0647; G06F 3/0649; G06F 3/065; G06F 3/0652; G06F 3/0655; G06F 3/0656; G06F 3/0658; G06F 3/0659; G06F 3/0661; G06F 3/0668; G06F 3/067; G06F 3/0671; G06F 3/0673; G06F 3/0674; G06F 3/0676; G06F 3/0677; G06F 3/0679; G06F 3/068; G06F 3/0682; G06F 3/0683; G06F 3/0685; G06F 3/0686; G06F 3/0688; G06F 3/0689
See application file for complete search history.

(56) References Cited

U.S. PATENT DOCUMENTS

| | | | | |
|---|---|---|---|---|
| 5,696,927 A | * | 12/1997 | MacDonald | G06F 12/023 710/68 |
| 5,774,715 A | * | 6/1998 | Madany | G06F 17/30153 |
| 5,813,011 A | * | 9/1998 | Yoshida | G06F 3/0608 |
| 5,960,465 A | * | 9/1999 | Adams | G06F 12/0292 710/68 |
| 6,175,896 B1 | * | 1/2001 | Bui | G06F 12/0802 709/247 |
| 6,266,753 B1 | * | 7/2001 | Hicok | G06F 12/1081 345/555 |
| 6,516,397 B2 | * | 2/2003 | Roy | G06F 12/08 709/247 |
| 6,564,346 B1 | | 5/2003 | Vollrath et al. | |
| 6,721,753 B1 | * | 4/2004 | Kataoka | G06F 3/0608 |
| 6,795,897 B2 | * | 9/2004 | Benveniste | G06F 12/08 707/999.101 |
| 6,879,266 B1 | * | 4/2005 | Dye | G06F 12/08 341/51 |
| 7,046,467 B1 | * | 5/2006 | Chheda | G06F 3/0608 360/48 |
| 7,124,275 B2 | * | 10/2006 | Gammel | G06F 12/1009 711/203 |
| 7,190,284 B1 | * | 3/2007 | Dye | G06F 12/023 341/51 |
| 7,200,733 B2 | * | 4/2007 | Hancock | G06F 12/1009 711/202 |
| 7,350,049 B1 | | 3/2008 | Li et al. | |
| 7,685,360 B1 | * | 3/2010 | Brunnett | G06F 3/0608 360/31 |
| 7,747,799 B2 | * | 6/2010 | Nakagawa | G06F 3/0608 710/33 |
| 7,904,750 B2 | | 3/2011 | Southerland et al. | |
| 8,019,925 B1 | * | 9/2011 | Vogan | G06F 12/04 711/202 |
| 8,516,218 B2 | * | 8/2013 | Sauer | G06F 3/0608 711/202 |
| 8,527,544 B1 | * | 9/2013 | Colgrove | G06F 3/0608 707/791 |
| 8,793,467 B2 | * | 7/2014 | Colgrove | G06F 3/0608 711/206 |
| 8,806,160 B2 | * | 8/2014 | Colgrove | G06F 3/0608 707/639 |
| 8,954,654 B2 | | 2/2015 | Yu et al. | |
| 2002/0147893 A1 | * | 10/2002 | Roy | G06F 12/08 711/154 |
| 2003/0217237 A1 | * | 11/2003 | Benveniste | G06F 12/08 711/153 |
| 2004/0221128 A1 | * | 11/2004 | Beecroft | G06F 12/1018 711/203 |
| 2005/0060515 A1 | * | 3/2005 | Hancock | G06F 12/1009 711/206 |
| 2005/0249008 A1 | * | 11/2005 | Hsieh | G06F 3/0608 365/189.011 |
| 2008/0071981 A1 | | 3/2008 | Hung et al. | |
| 2008/0288678 A1 | * | 11/2008 | Nakagawa | G06F 3/0608 710/68 |
| 2010/0023682 A1 | * | 1/2010 | Lee | G06F 12/0246 711/103 |
| 2011/0072235 A1 | * | 3/2011 | Deming | G06F 12/1027 711/207 |
| 2011/0087840 A1 | * | 4/2011 | Glasco | G06F 12/08 711/118 |
| 2014/0244901 A1 | | 8/2014 | Kumar et al. | |
| 2015/0095609 A1 | * | 4/2015 | Smith | G06F 12/10 711/206 |
| 2015/0154118 A1 | | 6/2015 | Marcu et al. | |

(56) References Cited

U.S. PATENT DOCUMENTS

2015/0169465 A1* 6/2015 Slepon ............... G06F 12/1009
                                              711/103
2016/0092371 A1* 3/2016 Shanbhogue ....... G06F 12/1009
                                              711/207
2017/0083450 A1* 3/2017 Seiler ................. G06F 12/1009

OTHER PUBLICATIONS

Understanding and Alleviating the Impact of the Flash Address Translation on Solid State Devices; Zhou et al; ACM Transactions on Storage (TOS)—Special Issue on MSST 2016 and Regular Papers, vol. 13, iss. 2, article No. 14; Jun. 2017 (29 pages) (Year: 2017).*

Approximate memory compression for energy-efficiency; Ranjan et al; IEEE/ACM International Symposium on Low Power Electronics and Design; Jul. 24-26, 2017 (6 pages) (Year: 2017).*

FEACAN: Front-end acceleration for content-aware network processing; Qi et al; Proceedings IEEE INFOCOM; Apr. 10-15, 2011 (9 pages) (Year: 2011).*

Improving performance and lifetime of solid-state drives using hardware-accelerated compression; Lee et al; IEEE Transactions on Consumer Electronics, vol. 57, iss. 4; Nov. 2011; pp. 1732-1739 (8 pages) (Year: 2011).*

Motto et al., Defect List Compression, Data Compression Conference, 2008, Snowbird, UT, 10 pages.

* cited by examiner

ADDRESS MAPPING TABLE COMPRESSION

SUMMARY

In some embodiments, an apparatus can include a circuit configured to intercept a mapping table entry and a command to store the mapping table entry to a mapping table, from a controller to a memory, and determine a first data field and a second data field in the mapping table entry. Further, the circuit can be configured to compress the first data field using a first data compression method to produce a compressed first data field, compress the second data field using a second, different data compression method to produce a compressed second data field, and store the compressed first data field and the compressed second data field to the memory.

In some embodiments, a system can include a memory including a mapping table, where the mapping table includes a mapping table entry. The system may further include a circuit configured to intercept the mapping table entry and a command to store the mapping table entry to the mapping table, from a controller to the memory, and determine a first data field and a second data field in the mapping table entry. The circuit can compress the first data field using a first data compression method to produce a compressed first data field, compress the second data field using a second, different data compression method to produce a compressed second data field, and store the compressed first data field and the compressed second data field to the memory.

In some embodiments, a method may include determining a selected logical block address ("LBA") mapping to update, determining a compression unit corresponding to the selected LBA mapping, determining a first compressed data group in the compression unit into which a first portion of the selected LBA mapping has been compressed and a second compressed data group in the compression unit into which a second portion the selected LBA mapping has been compressed, and decompressing the compression unit using a first circuit to decompress the first compressed data group and a second circuit to decompress the second compressed data group decompression to produce the selected LBA mapping, where the first circuit and the second circuit are not the same.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a hard disc drive. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
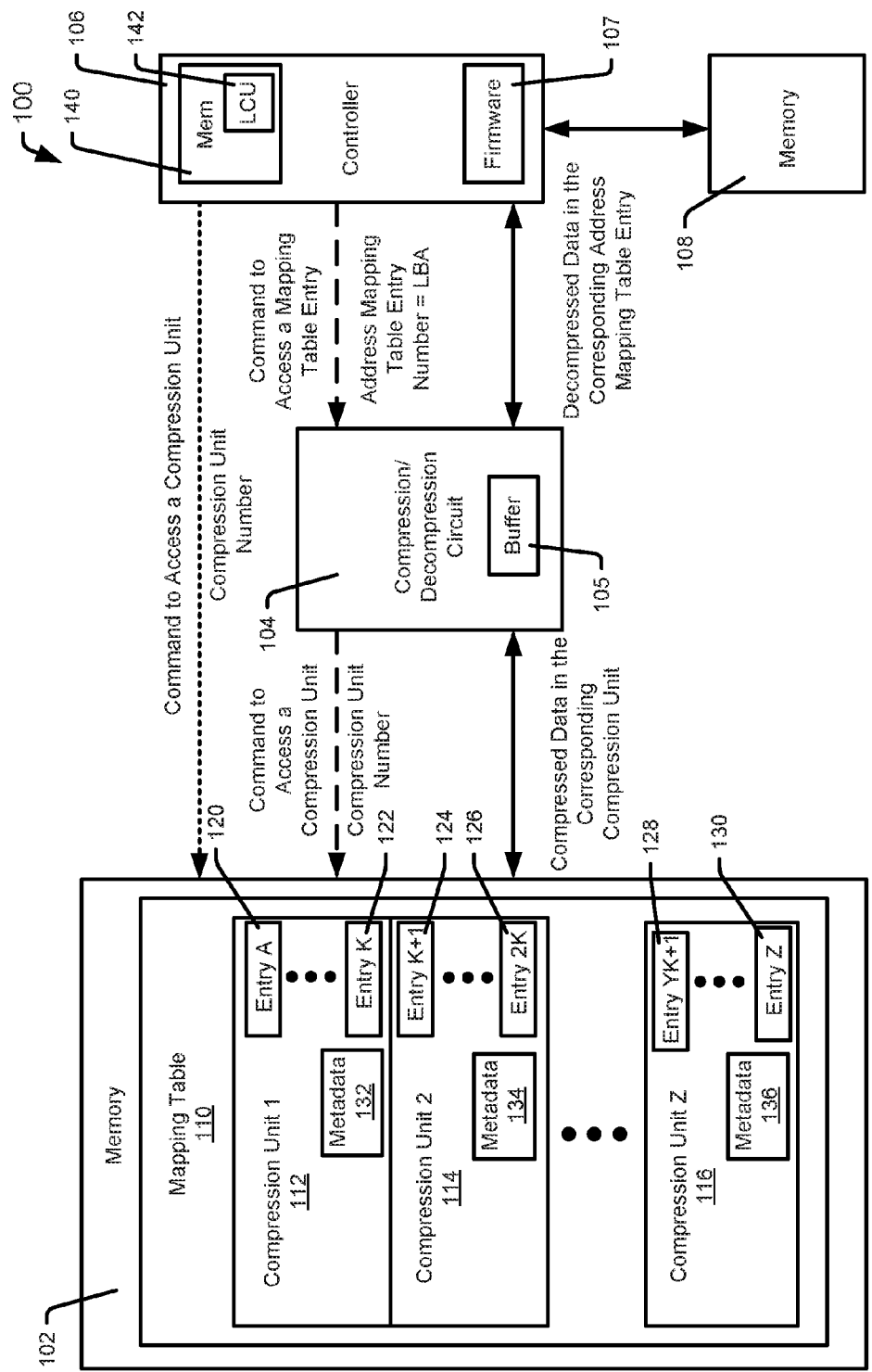
FIG. 1 is a diagram of a system of address mapping table compression, in accordance with certain embodiments of the present disclosure.

Referring to FIG. 1, a diagram of a system of address mapping table compression is shown and generally designated 100. The system 100 can include a memory 102, a memory 108, a compression circuit 104, and a data storage controller 106. In some embodiments, the memory 102 may be a volatile memory, such as dynamic random access memory ("DRAM"), double data rate ("DDR") memory, synchronous random access memory ("SRAM"), other volatile memory, or a non-volatile solid state memory ("NVSSM"). The memory 108 may be an NVSSM (e.g. NAND flash, NOR flash, etc.), disc memory, or other memory. In some embodiments, the memory 102 and the memory 108 may be components of a flash-based solid state memory device. A flash-based solid state memory device may store user data in a flash memory and mapping data in a faster memory (e.g. faster access times, transfer rates, etc.), such as random access memory. For example, the user data may be stored in the memory 108, which may be a NVSSM. The mapping data may be stored in the memory 102, which may be DDR memory. Some flash-based solid state memory devices, such as a universal serial bus ("USB") memory device, can include the controller 106 and the CDC 104.

The memory 102 can include a mapping table 110, which can include logical block address ("LBA") to physical address mappings corresponding to the data stored in the memory 108. In some cases, the size of the mapping table 110 may be proportional to the size of the memory 108. When the storage capacity of the memory 108 is increased, the size of the mapping table 110 and the memory 102 may increase. In implementations where the memory 102 is a volatile memory, increases in the storage capacity of the memory 102 to accommodate increasing numbers of LBA to physical address mappings can become costly since volatile memory may be an expensive memory resource. The amount of storage space in the memory 102 consumed by the mapping table 110 may be minimized by compressing uncompressed LBA to physical address mappings to produce compressed LBA to physical address mappings.

The mapping table 110 can include multiple compression units, such as compression unit one 112, compression unit two 114, and compression unit Z 116. Compression unit one 112, compression unit two 114, and compression unit Z 116 may include compressed mapping table entries. For example, compression unit one 112 can include a predetermined range of compressed mapping table entries, such as mapping table entry A 120 through mapping table entry K 122, compression unit two 114 can include a predetermined range of compressed mapping table entries, such as mapping table entry K+1 124 through mapping table entry 2K 126, and compression unit Z 116 can include a predetermined range of compressed mapping table entries, such as mapping table entry YK+1 through mapping table entry Z 130. Further, the compression unit one 112 may include metadata 132, compression unit two 114 may include metadata 134, and compression unit Z 116 may include metadata 136. Metadata 132, metadata 134, and metadata 136 can include information to identify which portions of the mapping table entries A 120 through Z 130 were successfully compressed.

The compressed mapping table entries A 120 through Z 130 may be compressed and decompressed by the compression/decompression circuit ("CDC") 104, which can include a buffer 105. The buffer 105 may be a random access memory ("RAM"), DRAM, or other memory. In some embodiments, CDC 104 may be an application specific integrated circuit ("ASIC"), a chip programmable logic device ("CPLD"), field programmable gate array ("FPGA"), a system on chip, or other circuit. In some embodiments, the CDC 104 may be integrated with a controller, such as controller 106 or other processing device.

The controller 106 can include a memory 140, which may be a non-volatile memory, and circuits or firmware 107 having instructions that when executed by the controller 106, cause the controller 106 to perform certain functions, such as mapping table lookups, mapping table entry modifications, or other tasks. For example, the controller 106 may determine an LBA to physical address mapping by looking up a compressed mapping table entry in the mapping table 110. In some embodiments, the firmware 107 may include a count of how many compressed mapping table entries are included in a compression unit, and how many compression units are in the mapping table 110.

A compressed mapping table entry can include an LBA to physical address mapping. For example, compressed mapping table entry A 120 can include an LBA to physical address mapping corresponding to LBA 120. In some examples, each of the compression unit one 112, compression unit two 114, and compression unit Z 116 can have the same number of mapping table entries. For example, compression unit one 112, compression unit two 114, and compression unit Z 116, can have K+1 mapping table entries, and each one of the K+1 mapping table entries can correspond to a LBA.

During operation, the controller 106 may access or update some of the compressed mapping table entries A 120 through Z 130 when data is stored to the memory 108. For example, when data is stored to the memory 108, the controller 106 can execute instructions of the firmware 107 to determine a location in the memory 108 in which to store the data, and then select a compressed mapping table entry in the mapping table 110 to update based on an LBA(s) corresponding to the data. However, in some embodiments, hardware circuits, such as ASICs or other circuits, can determine a location in the memory 108 in which to store the data, and select a compressed mapping table entry in the mapping table to update. In some examples, the controller 106 or other circuits can process instructions in firmware or software to determine a location in the memory 108 in which to store the data, and select a compressed mapping table entry to update. The firmware or software may be stored separately from the controller 106, such as in a separate non-volatile memory. Further, a combination of hardware circuits and firmware or software may be able to perform the functions described herein.

The controller 106 may also modify a compressed mapping table entry during cleaning or garbage collection operations. In a garbage collection operation, valid data (e.g. data that may be accessed) may be moved from a data block to another data block, allowing invalid data (e.g. data that may not be accessed) to be erased from the first block. When the valid data is moved from the first block to another block, or invalid data is erased, a compressed mapping table entry may be changed.

A process of updating one or more mapping table entries may begin when the controller 106 looks up a compressed mapping table entry in the mapping table 110. The controller 106 can transmit an access command to the memory 102 to retrieve a compression unit corresponding to the requested compressed mapping table entry. For example, the access command can include instructions to have the memory 102 provide the compression unit one 112 to the controller 106. However, the compression unit one 112 may be intercepted by the CDC 104. The CDC 104 can decompress the compression unit one 112 to produce an uncompressed version of the mapping table entry. The controller 106 can determined a location of the data based on mapping data in the uncompressed mapping table entry. In some embodiments, the CDC 104 may store the uncompressed mapping table entry to the buffer 105. The controller 106 may retrieve the uncompressed mapping table entry from the buffer 105.

To update the uncompressed mapping table entry, the controller 106 may update at least some of the uncompressed mapping table entries in the buffer 105 with new or updated LBA to physical address mappings. In some embodiments, the controller 106 can update mapping table entries by retrieving uncompressed versions of the mapping table entries from the buffer 105 and changing the mapping data in the mapping table entries. In some embodiments, the controller 106 may modify more than one uncompressed mapping table entry at a time.

When the uncompressed mapping table entries are updated, the controller 106 can move the updated uncompressed mapping table entries to the memory 102. A move operation can include the controller 106 transmitting the updated uncompressed mapping table entries and a command to store the updated uncompressed mapping table entries to a compression unit in the memory 102. The access command can include the compression unit identifier. The move operation then deletes the mapping table entries in the buffer 105, such as by setting an indicator that the data locations in the buffer 105 that store the copied uncompressed mapping table entries are available for storage of other data. However, the updated uncompressed mapping table entries and the command to store the updated uncompressed mapping table entries may be intercepted by the CDC 104. The CDC 104 can compress the updated uncompressed mapping table entries to produce updated compressed mapping table entries by grouping data from the updated uncompressed mapping table entries into one or more data groups and then compressing the data groups using a compression algorithm to create a compressed group. The CDC 104 can transmit the updated compressed mapping table entries to the memory 102 to be included in the compression unit.

The compression unit identifier may be a number based on an LBA number corresponding to the compressed mapping table entry. In some embodiments, the controller 106 may determine a compression unit number using the following equation:

Compression Unit Number=(LBA Number+1)/Z+1;
where

Z is the number of the last compression unit.

For example, if the mapping table 110 has five compression units, a compression unit corresponding to LBA 16 may be found in the fifth compression unit. The equation may be used to determine a compression unit number when there are a static number of entries per compression unit.

Another way to determine a compression unit number can be to look up the compression unit number in a lookup table ("LUT"). The lookup table could contain a first LBA corresponding to each compression unit. The controller 106 can walk through (e.g. search using a linear search method, binary search method, or other search method) the LUT until LUT[N]<=LBA<LUT[N+1], where LBA can be the first LBA in the compression unit N. A linear search method can include searching the locations in the LUT in an ascending or descending index order. A binary search method can include starting a search at a midpoint between two entries in the LUT, and, if the compression unit number is not found, searching again at a midpoint between one of the previous entries and the previous midpoint, and repeating the process until the compression unit number is found. Using LUTs can be used when there are a dynamically sized number of entries in a compression unit. There may be other equations or techniques not shown that can be used to determine the compression unit number in non-equal sized compression units. In some examples, the LUT may be stored in the memory 140, the memory 102, or other memory.

A location of a compression unit in the memory 102 may be determined by accessing a list of compression units 142. For example, the list of compression units 142 may be accessed by an ASIC, FPGA, the controller 106 executing instructions from the firmware 107, other circuits, other firmware, or any combination thereof. The list of compression units 142 can include a mapping of the compression unit one 112, compression unit two 114, and compression unit Z 116, with their respective physical locations in the memory 102. For example, when the controller 106 wants to lookup or modify the compressed mapping table entry K+1 124, the controller 106 can determine that the compressed mapping table entry K+1 124 is in compression unit two 114, determine a physical location of compression unit two 114 via the list of compression units 142, and then transmit an access command to the memory 102 for compression unit two 114. When the controller 106 transmits an access command for the compression unit to the memory 102, the controller 106 can include the location of the compression unit obtained from the list of compression units 142. In some examples, the list of compression units 142 may be stored to the memory 140 during design or manufacture of the system 100. In some embodiments, the list of compression units 142 may be modified by the controller 106 or other circuit.

Data in compression unit one 112, compression unit two 114, and compression unit Z 116 may be arranged into data groups, and the data groups may be compressed via different compression methods. Further, the data groups may include data from portions of mapping table entries. For example, the data groups corresponding to the compression unit 112 may include portions of the compressed mapping table entries A 120 through K 122 associated with a page address field, a block address field, or other data fields.

The CDC 104 may compress the data groups using different compression algorithms to achieve a highest possible compression ratio. The compression algorithms may be selected based on characteristics of the data in the data groups, such as whether the data has unique patterns, repeated patterns, sequential patterns, and so forth. The CDC 104 can monitor access patterns of all of the entries in the data groups to determine if the data groupings may be changed. Changes to data groupings may be based on the access patterns. For example, when the system 100 is manufactured, an assumption may be made that all of the data may be written logically sequential (i.e. a next location of the data is based on its current location and previous locations), and therefore the data can be grouped into groupings sequential order (e.g. sequential LBA order). During operation, however, the CDC 104 may determine that there are a subset of mapping table entries that are being updated more frequently than other entries, and that the frequently updated mapping table entries are temporally associated with each other (i.e. are being updated near in time to each other). The CDC 104 may determine to group the subset of frequently updated mapping table entries into a data group because having the mapping table entries updated near in time to each other can mean that some of the parameters of the mapping table entries in the subset can have a higher compression ratio than parameters of the other mapping table entries. There may be other criteria that can be used to determine the data groupings, such as a last time a mapping table entry was accessed.

Figure 2:
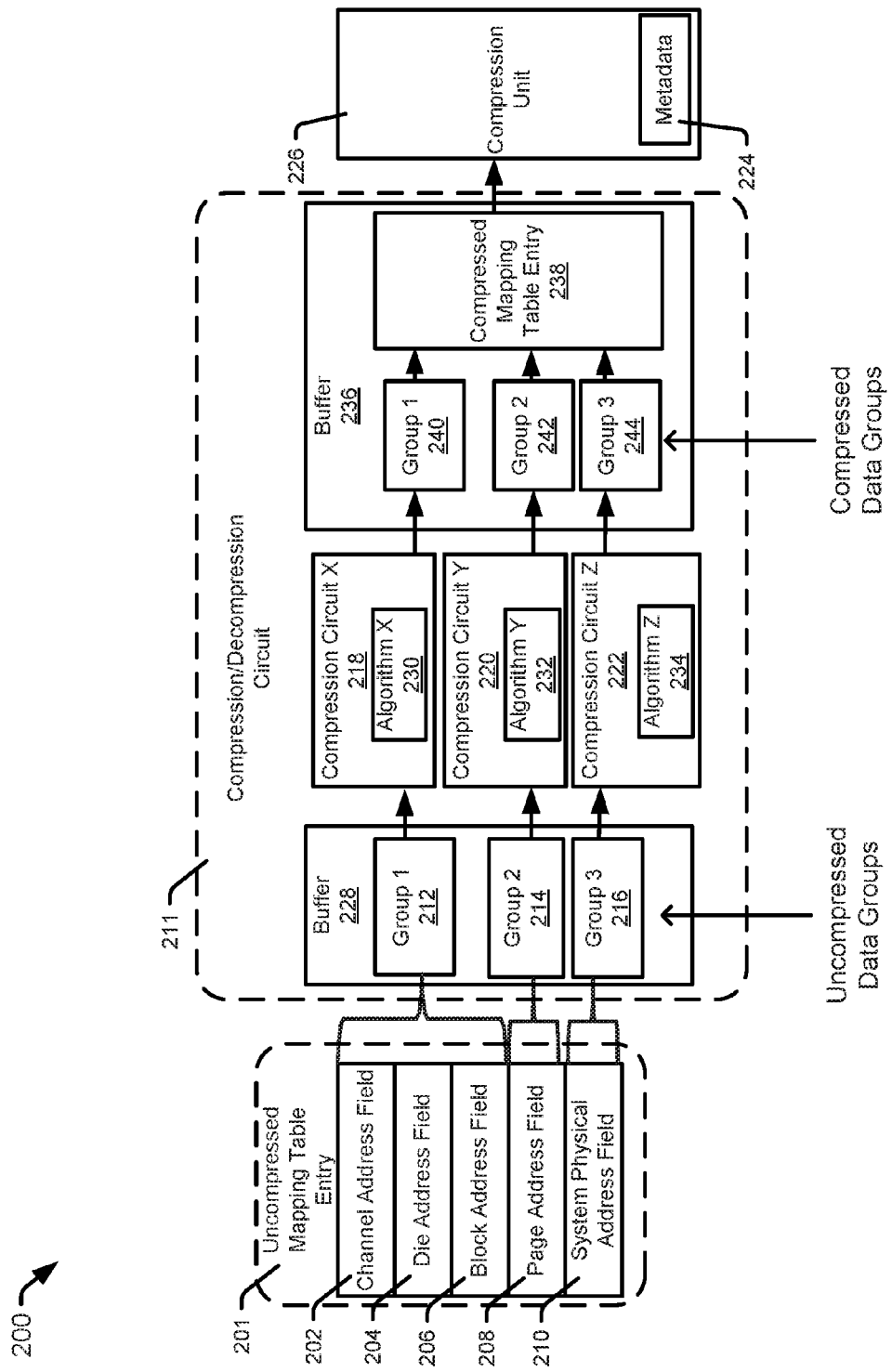
FIG. 2 is a functional block diagram of a system of address mapping table compression, in accordance with certain embodiments of the present disclosure.

Referring to FIG. 2, a functional block diagram of a system of address mapping table compression is shown and generally designated 200. The system 200 may be an embodiment of system 100. The system 200 may include an uncompressed mapping table entry 201, CDC 211, and compression unit 226. In some examples, the compression unit 226 can include metadata 224. In some embodiments, the CDC 211 may be the CDC 104, and can include a buffer 228 coupled to compression circuit X 218, compression circuit Y 220, and compression circuit Z 222. The compression circuit X 218, compression circuit Y 220, and compression circuit Z 222 may be ASICs or other circuits, and can be configured to implement compression algorithm X 230, compression algorithm Y 232, and compression algorithm Z 234, respectively. The CDC 211 may further include buffer 236, which may be the buffer 228.

The uncompressed mapping table entry 201 can include multiple data fields, such as channel address field 202, die address field 204, block address field 206, page address field 208, and system physical address field 210, although the uncompressed mapping table entry 201 may have more or fewer data fields. A data field may be a portion of the uncompressed mapping table entry 201 that can store binary data, hexadecimal data, or other data. The data may indicate a logical or physical address of user data in an NVSSM.

In some embodiments, the channel address field 202 may include information describing in which channel(s) the user data may be stored. For example, some flash memory may include two channels, and each channel may be a physical portion of the flash memory separate from the other channel. Flash memory that includes two channels may have an increased throughput compared to flash memory with just one channel since data may be read from one channel while data is concurrently stored to the other channel.

A channel may include multiple memory die. A memory die may be a semiconductor device configured to store data in blocks and pages. When a dual channel or single channel memory includes multiple memory die, an indicator of an address of the memory die(s) in which the data is located may be stored to the die address field 204.

Data blocks may be segments of the memory die. The data blocks can include multiple pages, and the pages can store the user data. For example, block may include 64 pages. In some examples, data may be stored on a page basis, but erased on a block basis. The block address field 206 can indicate in which block(s) the data is stored, and the page address field 208 can indicate in which page(s) the data is stored. A system physical address field can indicate where the in the data storage device the memory is located.

During operation, the mapping table entry fields 202 to 210 may be arranged into uncompressed data group one 212, uncompressed data group two 214, and uncompressed data group three 216 by the CDC 211, and stored to the buffer 228. For example, the channel address field 202, die address field 204, and block address field 206 may be arranged into uncompressed data group one 212. Further, the page address field 208 may be arranged into uncompressed data group two 214, and the system physical address field 210 may be arranged into uncompressed data group three 216. In some embodiments, there may be more or fewer uncompressed data groups. For example, there may be two uncompressed data groups or four uncompressed data groups.

Each uncompressed data group may correspond to a different compression algorithm (e.g. compression type, compression method). For example, uncompressed data group one 212 can correspond to compression algorithm X 230, uncompressed data group two 214 can correspond to compression algorithm Y 232, and uncompressed data group three 216 can correspond to compression algorithm Z 234. The compression algorithm X 230, compression algorithm Y 232, and compression algorithm Z 234, may be selected to optimize compression based on characteristics of mapping table entry field data in the uncompressed data group one 212, uncompressed data group two 214, and uncompressed data group three 216. In some cases, the characteristics of the mapping table entry field data can include constant data values, sequential data values, data patterns, and so forth. In examples, a compression method may include a base-delta-immediate ("BDI") compression algorithm, frequency-compression ("FP") algorithm, or other algorithm such as a data differencing algorithm or a lossless Lempei-Ziv compression algorithm. In some embodiments, a BDI algorithm may be selected to compress data groups whose data includes sequential patterns. BDI compression algorithms may store a base value in the data group and represent other data using a delta value from the main value, where the main value may be a mean or median value of the data. In some cases, an FP algorithm may be selected when the group data rarely changes since the FP compression algorithm may store unique patterns and compress repeated patterns. In some embodiments, a Lempei-Ziv compression algorithm may be selected to compress data that includes repeated occurrences.

The compression algorithm X 230, compression algorithm Y 232, and compression algorithm Z 234, may be predetermined based on a predicted application of the CDC 211. For example, in systems where mapping table data may be predominantly sequential and have unchanging patterns, such as repeating data patterns, the CDC 211 can be configured to implement FP and BDI type compression algorithms.

In some embodiments, once the compression algorithm X 230, compression algorithm Y 232, and compression algorithm Z 234 are included in the CDC 211, the compression algorithm X 230, compression algorithm Y 232, and compression algorithm Z 234 may not be changed. However, in some examples, the compression algorithm X 230, compression algorithm Y 232, and compression algorithm Z 234 may be changed. This may depend on how the CDC 211 is built or how firmware is programmed. For example, the CDC 211 may include a compression path (e.g. a controller or other circuitry) that can process firmware to provide compression. The firmware could include compression algorithms which may be updated on the fly. The CDC 211 can include configurable computing devices, such as an FPGA, that can be reconfigured to implement different compression algorithms without changing other hardware.

The CDC 211 can be configured to associate the compression algorithm X 230, compression algorithm Y 232, and compression algorithm Z 234, with the uncompressed data group one 212, uncompressed data group two, 214, and uncompressed data group three 216. In some cases, the associations may be fixed. For example, uncompressed data group one 212 may always be compressed by compression algorithm X 230, uncompressed data group two 214 may always be compressed with compression algorithm Y 232, and uncompressed data group three 216 may always be compressed with compression algorithm Z 234.

Uncompressed data groups into which the mapping table fields 202 to 210 may be arranged may depend on how well the mapping table fields 202 to 210 can be compressed by the compression circuit X 218, compression circuit Y 220, and compression circuit Z 222. For example, if the channel address field 202, die address field 204, and block address field 206 may be optimally compressed via compression circuit X 218, the channel mapping table field 202, die address field 204, and block address field 206 may be grouped into uncompressed data group one 212. If the channel address field 202, die address field 204, and page address field 208 may be optimally compressed by compression circuit X 218, and block address field 206 may be optimally compressed by compression circuit Z 222, then the channel address field 202, die address field 204, and page address field 208 may be grouped into uncompressed data group one 212, and the block address field 206 can be grouped into uncompressed data group three 216.

The uncompressed data groups one 212, uncompressed data group two 214, and uncompressed data group three 216, can be compressed by compression circuit X 218, compression circuit Y 220, and compression circuit Z 222, respectively, to produce compressed data group one 240, compressed data group two 242, and compressed data group three 244. The compressed data group one 240, compressed data group two 242, and compressed data group three 244 may correspond to the uncompressed data group one 212, uncompressed data group two 214, and uncompressed data group three 216, respectively. Uncompressed data group one 212, uncompressed data group two 214, and uncompressed data group three 216 may be combined to produce compressed mapping table entry 238. The compressed mapping table entry 238 may be added to the compression unit 226.

In some cases, an uncompressed version of a data group may be included in the compression unit 226 when the data group cannot be successfully compressed. A data group may not be successfully compressed if a compressed version of a data group takes up more storage space than did the uncompressed version of the data group. This may occur when there are unexpected changes in the data characteristics of the data group. For example, if the data unexpectedly changes frequently and the compression type is optimized for data that rarely changes, compression may be less than optimal or even unsuccessful.

The success of a compression operation may be determined by the CDC 211. The CDC 211 can compare a compressed size of a data group and a size of an uncompressed version of the data group. For example, the CDC 211 can compare the uncompressed data group one 212 with the compressed data group one 240 to determine if the compressed data group one 240 is smaller than the uncompressed data group one 212. When the compressed data group one 240 is smaller in size than the uncompressed version of data group one 212, the compression can be considered a success. The CDC 211 can include the compressed data group 240 in the compressed mapping table entry 238. Further, the CDC 211 may store an indicator to the metadata 224 indicating that the compressed data group one 240 was included in the compressed mapping table entry 238. When the uncompressed data group one 212 cannot be successfully compressed, the uncompressed version of data group one 212 may be included in the compressed mapping table entry 238. The compressed data group one 240 may be discarded. Further, an indicator to indicate that the uncompressed data group one 212 was included in the compressed mapping table entry 238 may be stored to the metadata 224.

When the compression unit 226 is later decompressed, the CDC 211 can determine a compression status of each data group in the compressed mapping table entry 238 from the indicators in the metadata 224, which may allow for a faster mapping table lookup time than if the metadata 224 did not include compression status indicators.

Figure 3:
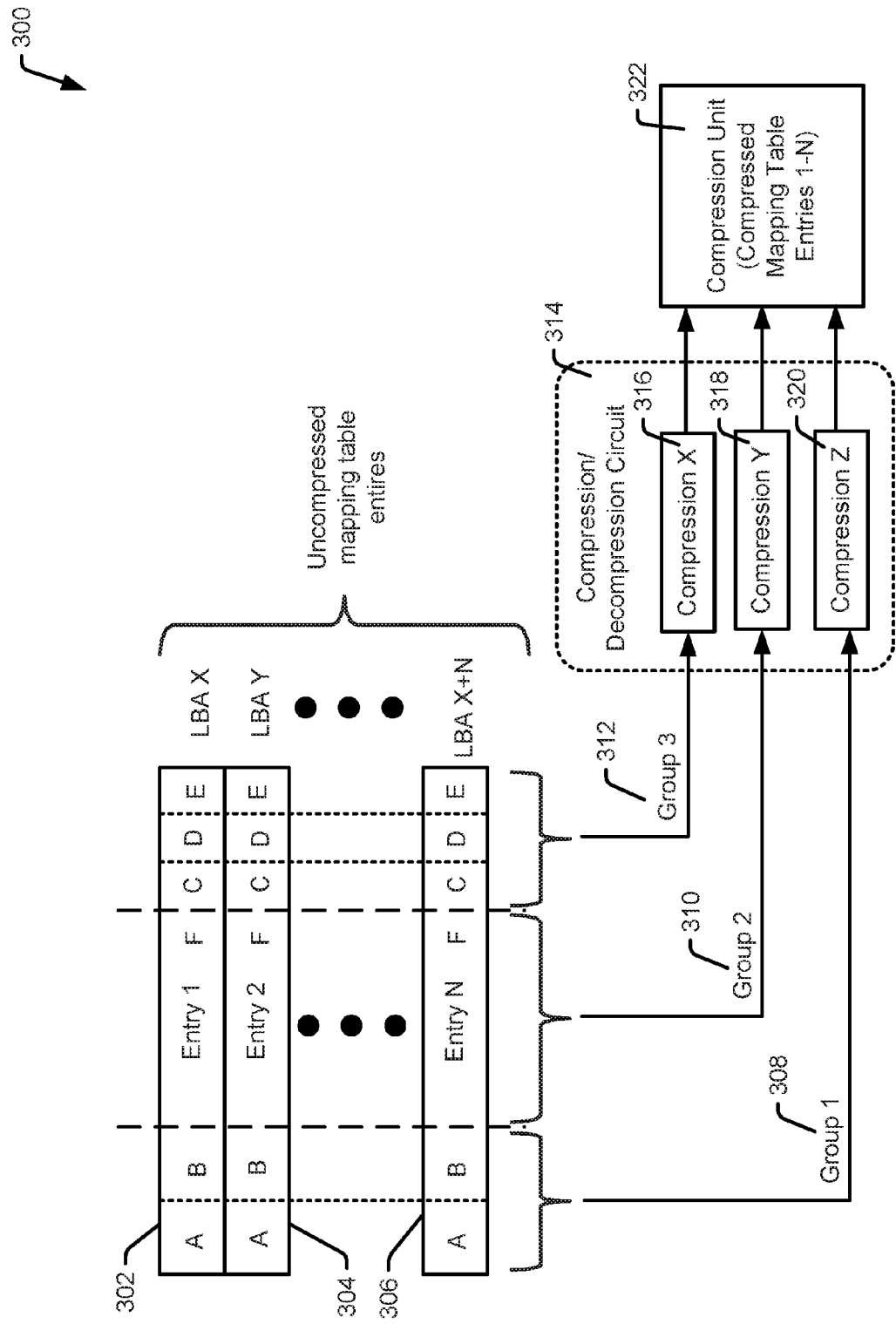
FIG. 3 is a diagram of a system of address mapping table compression, in accordance with certain embodiments of the present disclosure.

Referring to FIG. 3, a diagram of address mapping table compression is shown and generally designated 300. The system 300 may be an embodiment of systems 100 and 200. System 300 can include uncompressed mapping table entries one 302, two 304, and N 306. System 300 can further include a CDC 314 and compression unit 322.

The compression unit 322 may store N compressed mapping table entries. The compression unit 322 can store compressed versions of the uncompressed mapping table entry one 302, uncompressed mapping table entry two 304, and mapping table entry N 306. The number N of compression unit entries may be based on workloads corresponding to the uncompressed mapping table entry one 302, uncompressed mapping table entry two 304, and uncompressed mapping table entry N 306, and a desired size of the compression unit 322. In some embodiments, a workload be a description of a usage of a device, such as a data storage device. For example, a workload may be based on how data in the data storage device is accessed. A workload corresponding to accessing data that has been randomly written across all mapped storage locations of a data storage device may be different than a workload corresponding to data that has been sequentially updated across a localized region of a portion (e.g. 10%) of the mapped storage locations. The usage patterns may determine which compression algorithms to use, determine locations of compressible data sets in the uncompressed mapping table entry one 302, uncompressed mapping table entry two 304, determine other information, or any combination thereof.

When the uncompressed mapping table entry one 302, uncompressed mapping table entry two 304, and uncompressed mapping table entry N 306 have high workloads, and are accessed close in time, more uncompressed mapping table entries (e.g. 16 or 32) may be stored to the compression unit 322 as compared to when the uncompressed mapping table entry one 302, uncompressed mapping table entry two 304, and uncompressed mapping table entry N 306 have lower workloads or are logically sequential (e.g. 4 or 8). Further, the number N of compression unit entries may change during operation based on the workloads or for other reasons.

Address fields from the uncompressed mapping table entry one 302, uncompressed mapping table entry two 304, and uncompressed mapping table entry N 306 may be arranged into uncompressed data group one 308, uncompressed data group two 310, and uncompressed data group three 312. In some embodiments, an uncompressed data group may include the same fields from the uncompressed mapping table entry one 302, uncompressed mapping table entry two 304, and uncompressed mapping table entry N 306. For example, uncompressed data group one 308 may include data from fields A and B, uncompressed data group two 310 may include data from field F, and uncompressed data group three 312 may include data from fields C, D, and E In some embodiments, the uncompressed mapping table entry one 302, uncompressed mapping table entry two 304, and uncompressed mapping table entry N 306, may correspond to an LBA. For example, uncompressed mapping table entry one 302 may correspond to LBA X, uncompressed mapping table entry two 304 may correspond to LBA Y, and uncompressed mapping table entry N 306 may correspond to LBA X+N. When data is accessed or modified, one or more mapping table entries corresponding to the data's LBA(s) may be accessed by a controller to determine a physical address of the data. For example, a controller may access uncompressed mapping table entry two 304 to determine a physical location of data corresponding to LBA Y.

Figure 4:
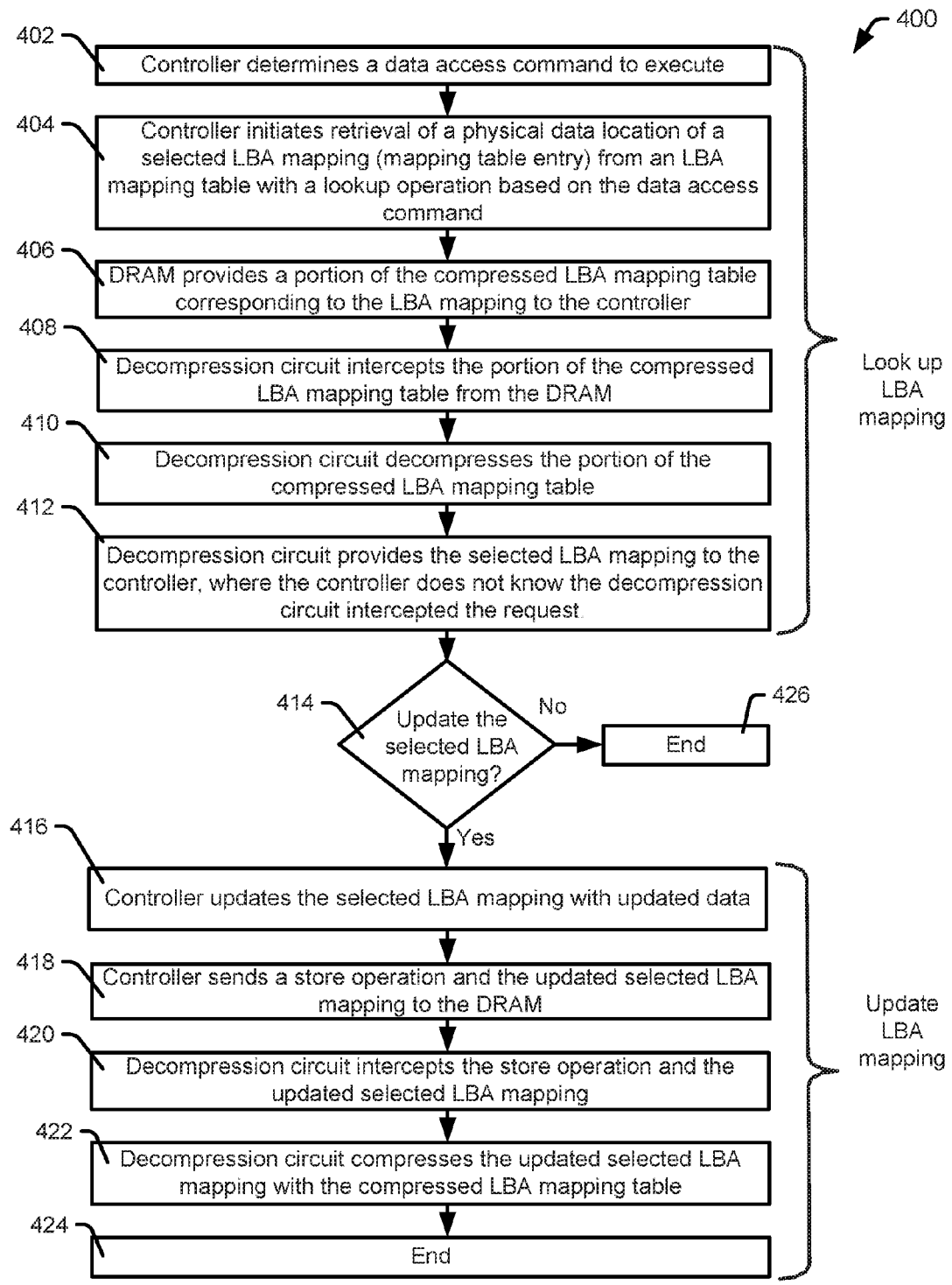
FIG. 4 is a flowchart of a method of address mapping table compression, in accordance with certain embodiments of the present disclosure.

Referring to FIG. 4, a flowchart of a method of address mapping table compression is shown and generally designated 400. The method 400 may be implemented by the systems 100, 200, and 300. The method 400 may be an example of how the systems 100, 200, and 300, lookup and modify mapping table data.

The method 400 can begin when a controller determines a data access command to execute. In some embodiments, the controller can determine a data access command when data is stored to an NVSSM, such as flash memory, when data is read from an NVSSM, or when data is moved within an NVSSM. The data access command can include instructions to retrieve one or more selected LBA mappings (e.g. mapping table entries) corresponding to the data from an LBA mapping table. In some embodiments, the LBA mapping table may be compressed in a volatile memory (e.g.

DRAM). The data access command can include instructions to retrieve at least a portion of the compressed LBA mapping table from the memory. The portion of the compressed LBA mapping table may include one or more selected LBA mappings. In some cases, the portion of the compressed LBA mapping table can include LBA mappings that were not selected. The portion of the compressed LBA mapping table may be a compression unit.

At 404, the controller can initiate retrieval of the compressed LBA mappings from the DRAM with a lookup operation based on the data access command. In some embodiments, the lookup operation can include the controller sending a request to the DRAM to retrieve the LBA mappings. The DRAM can transmit at least a portion of the compressed LBA mapping table to the controller in response to the request, at 406.

The compressed LBA mappings may be intercepted by a CDC, at 408. In some cases, the CDC can physically intercept the compressed LBA mappings because data lines that carry the compressed LBA mappings may be routed to the CDC instead of the controller.

At 410, the CDC may decompress the portion of the compressed LBA mapping table intercepted from the DRAM to produce uncompressed LBA mappings. The CDC may decompress the compressed portion of the LBA mapping table using one or more compression/decompression methods. The compression/decompression methods implemented by the CDC may be based on characteristics of the uncompressed LBA mappings, such as data patterns.

The method 400 can include the CDC provides the uncompressed LBA mappings to the controller, where the controller does not know the CDC intercepted the controller's request for the LBA mappings, at 412. The controller may not be aware that the LBA mappings are compressed in DRAM. The controller may access or modify the LBA mappings without being aware that a CDC is compressing or decompressing the LBA mappings.

The method 400 can include determining if an uncompressed LBA mapping may be updated, at 414. In some cases, an LBA mapping may be updated if data is stored to the NVSSM, or if data is moved from one location to another location in the NVSSM (e.g. garbage collection). If there are no uncompressed LBA mappings to update, the method 400 can end, at 426.

When there is an uncompressed LBA mapping to update, the method 400 can include the controller updates the uncompressed LBA mapping with updated mapping data, at 416. For example, the controller can update an uncompressed LBA mapping that maps LBA X to physical mapping address Y with an LBA mapping that maps LBA X to physical mapping address Z.

Once the uncompressed LBA mapping is updated, the method 400 can include the controller sends a store command and the updated uncompressed LBA mapping to the DRAM, at 418. The CDC may intercept the updated uncompressed LBA mapping and the store command, at 420. At 422, the method 400 can include the CDC compresses the updated uncompressed LBA mapping to produce the portion of the compressed mapping table, and stores the portion of the compressed LBA mapping table to the DRAM. The method 400 can end, at 424.

Figure 5:
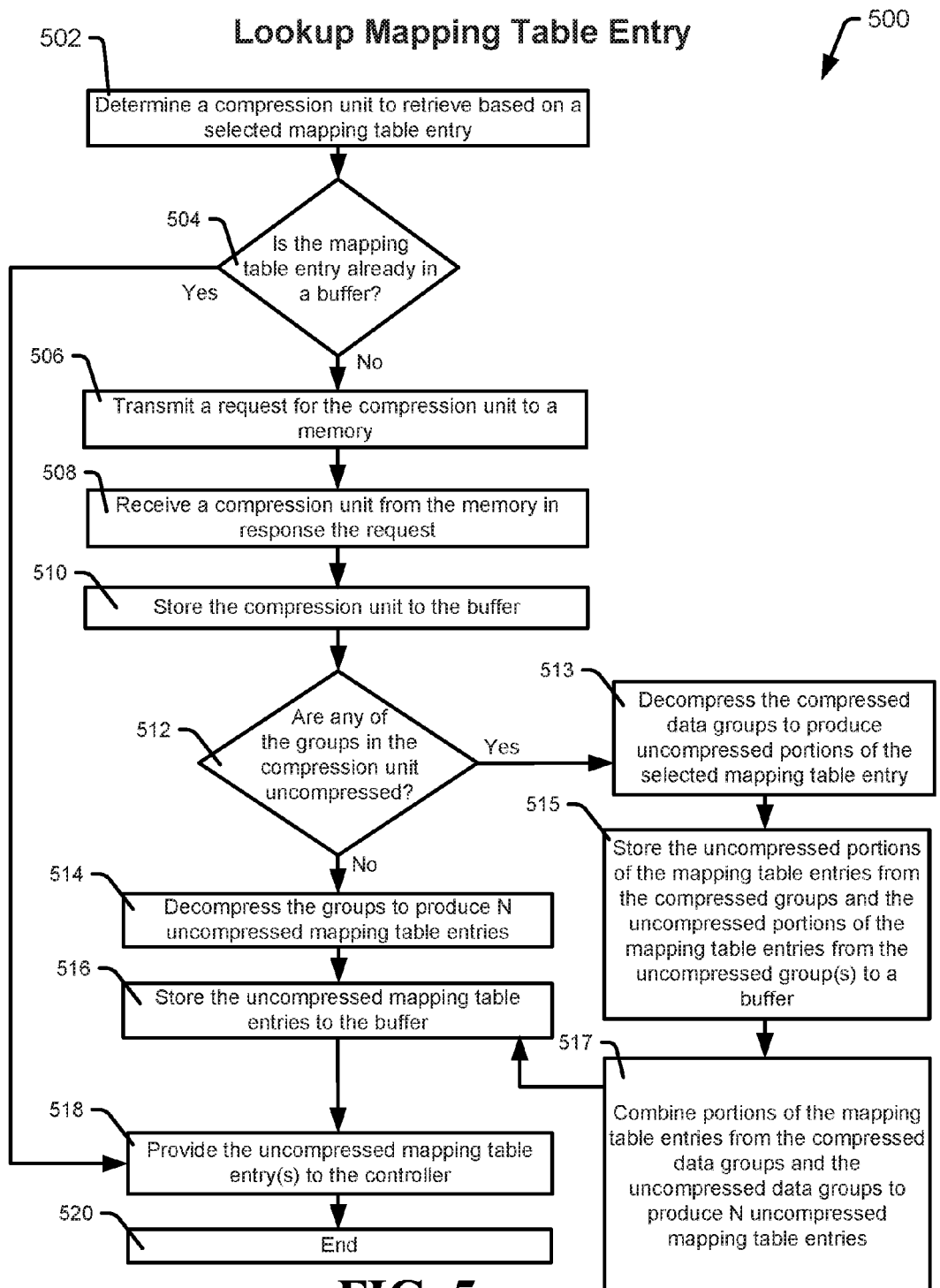
FIG. 5 is a flowchart of a method of address mapping table compression, in accordance with certain embodiments of the present disclosure.

Referring to FIG. 5, a flowchart of a method of address mapping table compression is shown and generally designated 500. The method 500 may be an example of the method 400, and may be implemented by the systems 100, 200, and 300. The method 500 may be an example of how a CDC can receive and decompress compression units to produce uncompressed mapping table entries.

The method 500 can include determining a compression unit to retrieve based on a selected mapping table entry to lookup. In some embodiments, the mapping table entry may be selected based on an LBA corresponding to data in an NVSSM. In some examples, a controller may look up a mapping table entry to determine an LBA to physical address mapping for data corresponding to the NVSSM data, at 502. The controller can determine a compression unit corresponding to the mapping table entry based on the mapping table entry's identifier (e.g. index number) and a number of mapping table entries included in each compression unit. In some embodiments, the method 500 may include determining if the selected mapping table entry is already in a buffer accessible to the CDC, at 504. In some cases, an uncompressed version of the selected mapping table entry may already be stored to the buffer. This may occur when the CDC wants to lookup more than one mapping table entry from the same compression unit. In some embodiments, the CDC can read a mapping table entry identifier from the uncompressed mapping table entries in the buffer to determine of any of the mapping table entries correspond to the selected mapping table entry. When the selected mapping table entry is already uncompressed and stored in the buffer, the method 500 can include providing the selected mapping table entry to the controller, at 518. In some embodiments, multiple mapping table entries already stored in the buffer may be provided to the controller.

When the selected mapping table entry is not available in the buffer, the method 500 can include transmitting a request for the compression unit, at 506. In some embodiments, the controller can transmit a command to a memory to provide the controller with the requested compression unit.

The method 500 can include receiving the compression unit, at 508, and storing the compression unit to a buffer, at 510. In some embodiments, the CDC may intercept the compression unit sent from the memory to the controller, and store the compression unit to a memory accessible to the CDC. In some embodiments, the compression unit can include N compressed mapping table entries.

The method 500 can include determining if the compression unit includes uncompressed data groups, at 512. In some examples, the CDC may determine if any of the data groups were not compressed by analyzing metadata corresponding to the compression unit. The metadata can include information to indicate whether a data group was successfully compressed.

When a data group was not successfully compressed, the method 500 can include decompressing data in compressed data groups to produce uncompressed portions of the selected mapping table entry, at 513. For example, a first data group can be decompressed to produce a portion of the mapping table entry. In some cases, a portion of the mapping table entry can include address fields, such as a die address field, a page address field, and so forth. The CDC can decompress the compressed data groups using decompression methods that correspond to a type of compression used to compress the groups. For example, if data group one was compressed via compression method "A", the CDC can decompress data group one using a decompression method corresponding to compression method "A".

At 515, the method 500 can include storing the uncompressed portions of the mapping table entries from the compressed data groups and the uncompressed portion(s) of the mapping table entries from the data groups that were not successfully compressed into a buffer. In some cases, the buffer may be a memory accessible to the CDC, such as in the controller. The portions of the mapping table entries from the compressed data groups and the data group(s) that was not successfully compressed may then be combined to produce N uncompressed mapping table entries, at 517. In some examples, N may be a number of mapping table entries in a compression unit. The N uncompressed mapping table entries may be stored to the buffer, at 516.

When all of the data groups were successfully compressed, the method 500 can include decompressing the compressed data groups to produce N uncompressed mapping table entries, at 514, and storing the N uncompressed mapping table entries to the buffer, at 516. For example, the decompressed data groups can be combined to reconstruct the N uncompressed mapping table entries.

The method 500 can include providing the N uncompressed mapping table entries to the controller, at 518. The CDC can transmit the N uncompressed mapping table entries in the buffer to the controller. The method 500 can end, at 520.

Figure 6:
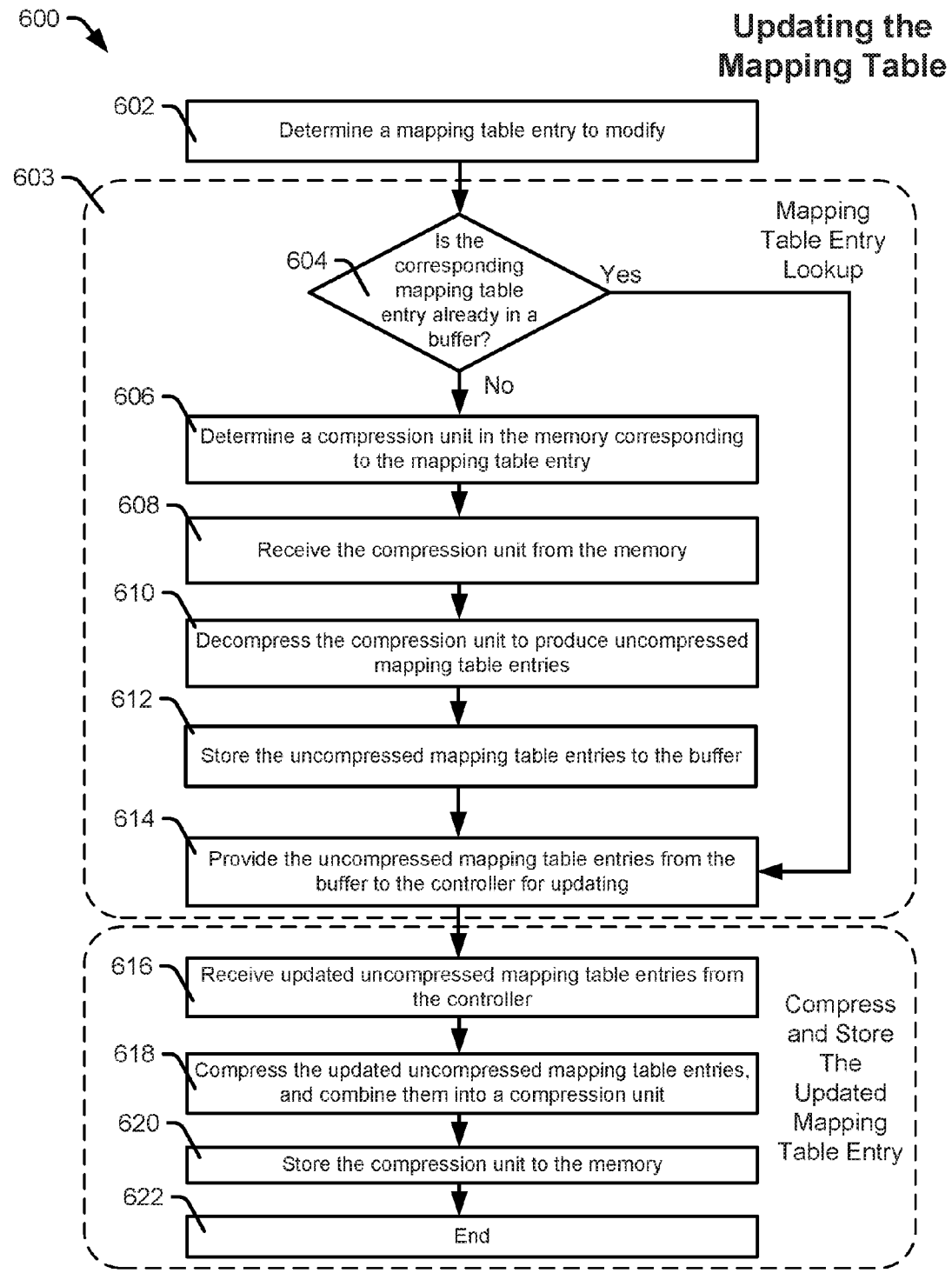
FIG. 6 is a flowchart of a method of address mapping table compression, in accordance with certain embodiments of the present disclosure.

Referring to FIG. 6, a flowchart of a method of address mapping table compression is shown and generally designated 600. The method 600 may be an example of method 400, and may be implemented by systems 100, 200, and 300. The method 600 can be an example of updating a mapping table.

The method 600 can begin by selecting a mapping table entry to modify, at 602. In some examples, a mapping table entry may be modified when data is stored to an NVSSM, causing an LBA to physical address mapping to change. The method 600 can include looking up a selected mapping table entry to modify, at 603. For example, the method 600 can include determining if an uncompressed version of the selected mapping table entry to modify is already stored in a buffer accessible to a CDC, at 604. A controller can determine if the selected mapping table entry is already stored in the buffer based on the information in a memory address register. A memory address register can include information as to which uncompressed mapping table entries may be stored in the buffer.

When the uncompressed selected mapping table entry is already stored in the buffer, the uncompressed selected mapping table entry may be provided to the controller for updating, at 614. In some examples, all of the uncompressed mapping table entries in the buffer may be provided to 742 the controller for updating. However, the controller may receive or update fewer uncompressed mapping table entries at a time, such as one or two entries at a time.

When the uncompressed selected mapping table entry is not already in the buffer, the method 600 can include determining a compression unit in a memory corresponding to the selected mapping table entry, at 606. In some cases, the memory may be DRAM. When the compression unit is determined, the method 600 can include receiving the compression unit from the DRAM, at 608. The received compression unit can be decompressed to produce uncompressed mapping table entries, at 610. The uncompressed mapping table entries can include the uncompressed selected mapping table entry. In some examples, the compression unit may be decompressed by the CDC. The uncompressed mapping table entries may be stored to a buffer accessible to the CDC, at 612, and provided to the controller for updating, at 614.

Once the controller has updated the uncompressed selected mapping table entry to produce an uncompressed updated mapping entry, the controller may transmit the uncompressed updated mapping entry to the CDC. In some examples, the controller may transmit some or all of the uncompressed mapping table entries to the CDC, even if the uncompressed mapping table entries were not modified. The CDC can receive the uncompressed mapping table entries, including the uncompressed updated mapping table entry, from the controller, at 616. In some embodiments, the uncompressed mapping table entries may be stored to the buffer or other memory accessible to the CDC.

The method 600 can include compressing the uncompressed mapping table entries, including the uncompressed updated mapping table entry, and combining them into a compression unit, at 618. Data in the uncompressed mapping table entries may be arranged into data groups. The CDC may compress each data group using a different compression algorithm or method. The compression algorithms used to compress the data may be based on characteristics of the data. For example, a compression algorithm may be used to compress data that rarely changes, another compression algorithm may be used to compress sequential data, and so forth.

The method 600 can further include storing the compression unit to the DRAM, at 620. In some embodiments, compression unit may be stored to its original location in the DRAM. For example, if the compression unit was stored to Die X, Page Y, and Block Z in the DRAM when the mapping table entries were accessed, the modified compression unit may be stored to the same location.

In some examples, a location in the DRAM for the compression unit may be selected each time the drive powers on. For example, the controller may determine a location in the DRAM based on the size and number of compression units in the mapping table. The size of a compression unit may be based on a number of mapping table entries included in the compression unit and a compression ratio of those mapping table entries. The number of mapping table entries in the compression units may be determined by the controller (or other components in a system). The compression ratio may be measurable once the CDC compresses the units to be stored. Therefore, the controller can know the exact size of each compression unit, and the total number of compression units. Further, the size and layout (e.g. structure of the data stored in DRAM) can be based on the available memory of the DRAM and the previous usage and storage of the compression units. The amount of physical DRAM may not change during the operation of the system (e.g. systems 100 and 200), but an amount of memory in the DRAM allocated to the mapping table may be dynamically adjusted based on usage. When the system boots up, the controller can determine a best allocation for the DRAM memory between the mapping table and any other usages of the memory, which can include user data, system data structures, firmware instructions and data, logging and debug information, other data, or any combination thereof.

Figure 7:
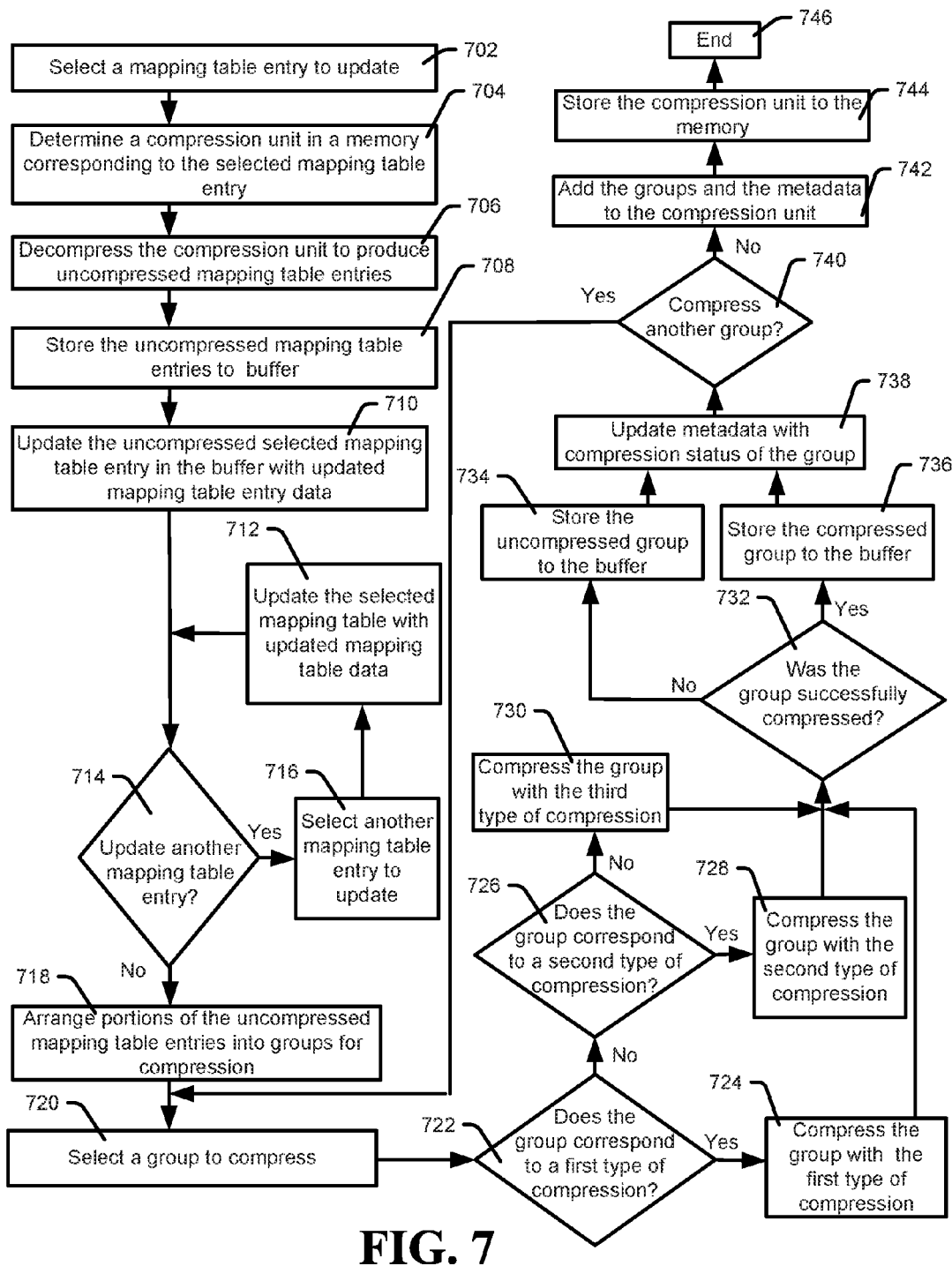
FIG. 7 is a flowchart of a method of address mapping table compression, in accordance with certain embodiments of the present disclosure.

Referring to FIG. 7, a flowchart of a method of address mapping table compression is shown and generally designated 700. The method 700 may be an example of the methods 400 and 600, and may be implemented by the systems 100, 200, and 300. The method 700 may be a detailed example of updating a mapping table with updated mapping table entries.

The method 700 can include selecting a mapping table entry to update, at 702. In some examples, a controller may select the mapping table entry to update based on changes to an LBA to physical address mapping when data is stored to, or moved within, a flash memory. At 704, the method 700 can include determining a compression unit in a memory corresponding to the selected mapping table entry. When the compression unit is determined, the method 700 can include decompressing the compression unit to produce uncompressed mapping table entries, including an uncompressed selected mapping table entry, at 706, and storing the uncompressed mapping table entries to a buffer, at 708.

At 710, the method 700 can include updating the uncompressed selected mapping table entry in the buffer with updated mapping table entry data, at 710. In some embodiments, a controller can retrieve the selected mapping table entry from the buffer, and then update the selected mapping table entry with the updated mapping table entry data. For example, the controller can update data in the die address field.

The method 700 can include determining if there are any more uncompressed mapping table entries in the buffer to update, at 714. In some cases, the controller may compare mapping table entry identifiers in the buffer to LBA to physical address mapping updates to determine if there are any more uncompressed mapping table entries in the buffer to update. For example, there may be multiple uncompressed mapping table entries to update when data that includes multiple LBAs is stored to the flash memory. When there are more mapping table entries to update, the method 700 can include selecting another of the uncompressed mapping table entries in the buffer to update, at 716. The selected uncompressed mapping table entry may be updated with updated mapping table data and stored in the buffer, at 712.

When all of the uncompressed mapping table entries selected for updating have been updated, the method 700 can include arranging portions of the uncompressed mapping table entries in the buffer into data groups for compression, at 718. For example, the CDC can arrange fields of data corresponding to the uncompressed mapping table entries into data groups. The CDC can determine the fields of data based on a location of the fields of data in the uncompressed mapping table entry. For example, a die address field may be the first two digits of the uncompressed mapping table entry, the block address field may be the second two digits of the uncompressed mapping table entry, and so forth. However, in some examples, data groups may be predetermined.

The method 700 can include selecting a data group to compress, at 720. The CDC may select one of the data groups to compress. An order in which the data groups can be selected may be based on the size of the data groups, where the data groups are stored in the buffer, or other factors. In some examples, the data groups may be compressed in order of their designation. For example, the data group designated as data group one may be compressed before the data group designated as data group two, and so forth. In some embodiments, the CDC may be programmed to select the order in which the data groups can be compressed. For example, the order in which the data groups may be compressed (or decompressed) may be configurable based on demand. If the data corresponding to data group two is needed to be updated or retrieved prior to data corresponding to data group one, the CDC can apply priority to access requests. The priority may be based on first in, first out ("FIFO"), a weighted priority based on a total number of access requests corresponding to a group, or other priority. Further, the CDC may keep a cache of uncompressed data for fast retrieval and updating. In this case, the CDC may choose which group to remove from the cache based on parameters of access to those groups. In an example, the CDC may evict a least recently used ("LRU") group from its cache. The evicted group may then be compressed and stored to the mapping table. There may be many different caching eviction policies that can be used.

Further, the CDC can be configured to compress the data group in parallel, which can increase speed. The CDC may perform multi-threaded operations. There may be many parallel requests for mapping table entry retrievals or updates, and the CDC can be configured to process the parallel requests. Processing the requests in parallel can result in faster access and update times as compared to processing the requests serially.

At 722, the method 700 can include determining if the selected data group to compress corresponds to a first type of compression, at 724. The CDC can determine if the selected data group corresponds to the first type of compression. In some examples, the CDC may include a table mapping each data group to a type of compression. For example, the table can include a mapping that maps data group one to compression type one, data group two to compression type two, and so forth. The CDC can compare the selected data group to the table to determine the compression type for the data group. In some cases, the CDC may perform test compressions with the compression algorithms to determine which compression algorithm is a best match for the selected data group. The CDC may perform the test compression periodically to ensure the CDC is consistently using the best compression algorithm.

When the selected data group can be compressed with the first type of compression, the method 700 can include compressing the selected data group, at 724. In some embodiments, the first type of compression may be BDI compression, although the first type of compression may include other compression methods.

When the selected data group cannot be compressed with the first type of compression, the method 700 can include determining if the selected data group can be compressed with the second type of compression, at 726. When the selected data group can be compressed with the second type of compression, the method 700 can include compressing the selected data group with the second type of compression, at 728. In some embodiments, the second type of compression may be based on an FP algorithm, which can be used to compressed repeated patterns.

When the selected data group cannot be compressed by the first type of compression or the second type of compression, the selected data group may be compressed by the third type of compression, at 730. In some embodiments, the third type of compression may be based on a differencing algorithm or a lossless Lempei-Ziv compression algorithm. In examples, there may be two types of compression or four or more types of compression.

After the selected data group has been compressed, the method 700 can determine if the selected data group was successfully compressed, at 732. A compression may be unsuccessful if the compressed data group is larger than the uncompressed version of the data group. The CDC can compare the size of the compressed data group to the size of the uncompressed data group to determine if the selected data group was compressed successfully.

The method 700 can include storing the compressed data group to the buffer when the data group was successfully compressed, at 736. If the data group was not successfully compressed, the method 700 can include storing an uncompressed version of the data group to the buffer, at 734. When the uncompressed version of the data group is stored to the buffer, the compressed version of the data group may not be stored to the buffer. Further, the compressed version of the data group may be discarded.

Metadata corresponding to the compression unit may be updated with a compression status of the selected data group, at 738. In some embodiments, the CDC may update the metadata with an identifier corresponding to the selected data group and an indicator to indicate if the selected data group was successfully compressed.

The method 700 can include determining if there are any other data groups to compress, at 740. In some examples, the number of data groups and the order in which the data groups can be compressed may be pre-determined. The CDC may be programmed to continue compressing data groups until the last data group is compressed and no more data groups are detected. For example, if the last data group to compress is data group three, the CDC may be programmed to stop compression operations after the third data group is compressed. In some cases, the CDC can access a list of the data groups, and may attempt to compress each data group in the list. If there are more data groups to compress, the method 700 can include selecting a data group to compress, at 720.

The method 700 can include adding the metadata and the compressed data groups to the compression unit, at 742. In some examples, the CDC may combine the data groups and the metadata into the compression unit, which may be one block of data. The compression unit may be structured to be self-describing, which can mean that when metadata is combined with compression data, each segment within the compression unit may be described. For example, consider a 512 byte data block storing 512 bytes of total data. If some of the data is compressed to produce 500 bytes of compressed data, 12 bytes of metadata can be added to the data block. The 12 bytes of metadata could describe the structure of the 12 bytes of metadata and the 500 bytes of compressed data The compression unit may be stored to the memory, at 744. In some embodiments, the CDC may transmit the compression unit and a command to store the compression unit to the memory. The command to store the compression unit may include a target memory location, which may be determined by the controller. For example, the target memory location may be based on how many compressed mapping table entries there are in a compression unit, how many compression units there are in the mapping table, available memory, FIFO corresponding to the target memory location, address lookup table, mathematical calculations, other methods, or any combination thereof.

In some examples, there may be more or fewer data groups. For example, the mapping table data may be arranged into two data groups, four data groups, or another number of data groups.

Figure 8:
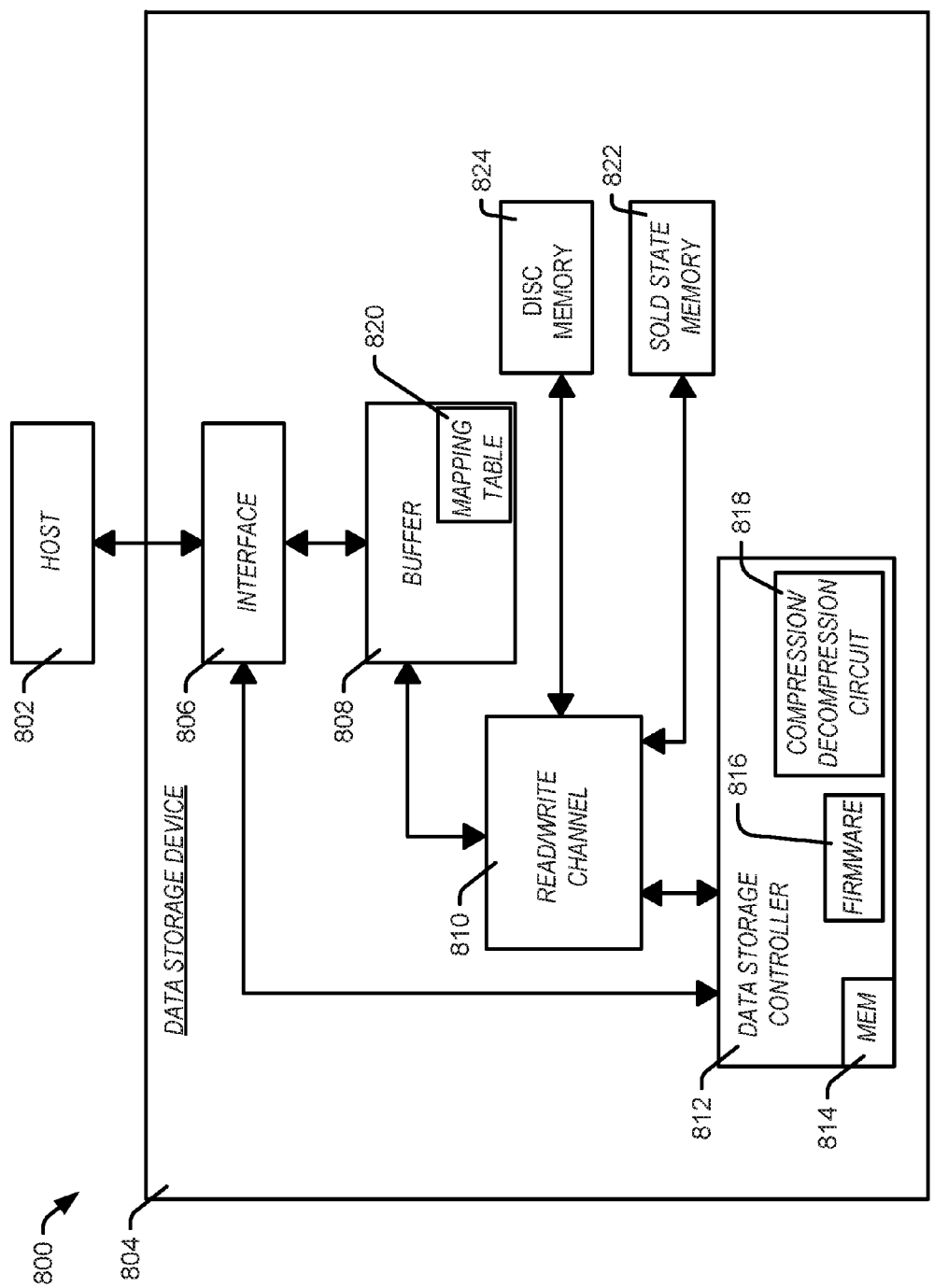
FIG. 8 is a diagram of a system of address mapping table compression, in accordance with certain embodiments of the present disclosure.

Referring to FIG. 8, a diagram of address mapping table compression is shown and generally designated 800. The system 800 may be an embodiment of systems 100, 200, and 300. A data storage device ("DSD") 804 can optionally connect to be removable from a host device 802, which can be a computer, a host bus adapter, a bus expander, a server, a telephone, a music player, another electronic device, or any combination thereof. The DSD 804 can communicate with the host device 802 via the hardware and firmware based host interface circuit 806 that may include a connector that allows the DSD 804 to be physically connected and physically disconnected from the host device 802.

The DSD 804 can include a data storage controller 812, which can include associated memory 814, firmware 816, and CDC 818. A buffer 808 can temporarily store data during read and write operations. In some cases, the buffer 808 can be a volatile memory, such as DRAM, SRAM, or other volatile memory. In some examples, the CDC 818 may be the CDC 104, the firmware 816 may be the firmware 107, and the controller 812 may be the controller 106, and the mapping table 820 may be the mapping table 110. Further, the DSD 804 can include a read/write (R/W) channel 810 which can encode data during write operations and decode data during read operations. The R/W channel 810 may be coupled to an SSM 822, and a disc memory 824.

The CDC 818 may compress and decompress a mapping table 820 in the SSM 822. The mapping table 820 may include information about where in the SSM 822 data is stored. For example, the mapping table 820 may include a channel address field, die address filed, block address field, and so forth. When data in the SSM 822 is accessed, mapping table entries in the mapping table 820 may be decompressed by the CDC 818, and provided to the data storage controller 812. The data storage controller 812 can execute instructions of the firmware to cause the data storage controller 812 to determine a location of the data based on the decompressed mapping table entries.

When data is stored to the SSM 822, the data storage controller 812 may determine a storage location for the data. The data storage controller 812 can update mapping table entries in the mapping table 820 with the storage location of the data. The updated mapping table entries may be provided to the CDC 818 by the data storage controller 812. The CDC 818 may determine compression algorithms for the updated mapping table entries, and compress the mapping table entries according to the determined compression algorithms. The compressed mapping table entries may be stored to the mapping table 820 by the CDC 818, such as via the R/W channel 810.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
 a circuit configured to:
  intercept a mapping table entry and a command to store the mapping table entry to a mapping table, the intercept occurring between a controller that generates the command and a memory that stores the mapping table;

determine a first data field and a second data field in the mapping table entry;
compress the first data field using a first data compression method to produce a compressed first data field;
compress the second data field using a second, different data compression method to produce a compressed second data field; and
store the compressed first data field and the compressed second data field to the memory.

2. The apparatus of claim 1 further comprising:
the circuit configured to:
combine the first compressed data field and the second compressed data field into a compression unit; and
store the compression unit to the memory.

3. The apparatus of claim 1 further comprising:
the first data compression method is selected based on data characteristics of the first data field; and
the second data compression method is selected based on data characteristics of the second data field.

4. The apparatus of claim 3 further comprising:
the data characteristics of the first data field and the data characteristics of the second data field include at least one of unique data patterns, repeated data patterns, sequential data patterns, and data patterns that rarely change.

5. The apparatus of claim 1 further comprising:
the circuit configured to:
intercept the first compressed data field and the second compressed data field when the memory sends the first compressed data field and the second compressed data field to the controller in response to a command from the controller for the mapping table entry.

6. The apparatus of claim 5 further comprising:
the circuit configured to:
decompress the first compressed data field to produce the first data field;
decompress the second compressed data field to produce the second data field;
combine the first data field and the second data field to reconstruct the mapping table entry; and
transmit the mapping table entry to the controller.

7. A system comprising:
a memory including a mapping table, where the mapping table includes a mapping table entry;
a circuit configured to:
intercept the mapping table entry and a command to store the mapping table entry to the mapping table;
determine a first data field and a second data field in the mapping table entry;
compress the first data field using a first data compression method to produce a compressed first data field;
compress the second data field using a second, different data compression method to produce a compressed second data field; and
store the compressed first data field and the compressed second data field to the memory.

8. The system of claim 7 further comprising:
the circuit configured to:
combine the first compressed data field and the second compressed data field into a compression unit; and
store the compression unit to the memory.

9. The system of claim 8 further comprising:
the compression unit includes metadata to indicate a compression status of the first compressed data field and the second compressed data field.

10. The system of claim 8 further comprising:
the compression unit is configured to store data fields corresponding to multiple mapping table entries, where a number of multiple mapping table entries is based on workload.

11. The system of claim 7 further comprising:
the mapping table entry is an updated mapping table entry, where the updated mapping table entry is provided by the controller when user data is stored to a second memory.

12. The system of claim 11 further comprising:
the first data compression method is selected based on data characteristics of the first data field;
the second data compression method is selected based on data characteristics of the second data field; and
the data characteristics of the first data field and the data characteristics of the second data field include at least one of unique data patterns, repeated data patterns, sequential data patterns, and data patterns that rarely change.

13. The system of claim 7 further comprising:
the circuit configured to:
intercept the first compressed data field and the second compressed data field when the memory sends the first compressed data field and the second compressed data field to the controller in response to a command from the controller for the mapping table entry.

14. The system of claim 13 further comprising:
the circuit configured to:
decompress the first compressed data field to produce the first data field;
decompress the second compressed data field to produce the second data field;
combine the first data field and the second data field to reconstruct the mapping table entry; and
transmit the mapping table entry to the controller.

15. The system of claim 7 further comprising:
the memory is a volatile solid state memory;
the second memory is a non-volatile solid state memory ("NVSSM"); and
the controller includes the circuit.

16. A method comprising:
determining a selected logical block address ("LBA") mapping to update, the LBA mapping including a mapping table entry identifying a physical storage location to which data corresponding to the LBA is stored;
determining a compression unit corresponding to the selected LBA mapping, the compression unit including a plurality of compressed mapping table entries;
determining a first compressed data group in the compression unit into which a first portion of the selected LBA mapping has been compressed and a second compressed data group in the compression unit into which a second portion of the selected LBA mapping has been compressed; and
decompressing the compression unit using a first circuit to decompress the first compressed data group and a second circuit to decompress the second compressed data group to produce the selected LBA mapping, where the first circuit and the second circuit are different.

17. The method of claim 16 further comprising:
prior to decompressing the compression unit, determining if the selected LBA mapping is already in a buffer; and providing the selected LBA mapping to a requesting controller when the selected LBA mapping is already in the buffer.

18. The method of claim 17 further comprising:

determining if the first compressed data group was successfully compressed, where a data group is successfully compressed when a compressed version of the data group is smaller than an uncompressed version of the data group;

storing the first portion of the LBA mapping to the buffer when the first compressed data group was not successfully compressed;

decompressing the first compressed data group to produce the first portion of the LBA mapping, and storing the first portion of the LBA mapping to the buffer when the first compressed data group was successfully compressed;

determining if the second compressed data group was successfully compressed, and storing the second portion of the LBA mapping to the buffer when the second compressed data group was not successfully compressed;

decompressing the second compressed data group to produce the second portion of the LBA mapping, and storing the second portion of the LBA mapping to the buffer when the second compressed data group was successfully compressed; and combining the first portion of the LBA mapping and the second portion of the LBA mapping to produce the selected LBA mapping.

19. The method of claim 16 further comprising:

receiving the selected LBA mapping;

updating the selected LBA mapping with updated LBA mapping data to produce an updated LBA mapping;

arranging a first portion of the updated LBA mapping into a first uncompressed data group and the second portion of the updated LBA mapping into a second uncompressed data group;

compressing the first uncompressed data group with the first circuit to produce the first compressed data group where the first circuit is selected based on data characteristics of the first uncompressed data group; and compressing the second uncompressed data group with the second circuit to produce the second compressed data group where the second circuit is selected based on data characteristics of the second uncompressed data group.

20. The method of claim 19 further comprising:

combining the first compressed data group and the second compressed data group, and storing them to the compression unit.

* * * * *